(12) United States Patent
Eriksson et al.

(10) Patent No.: US 11,229,960 B2
(45) Date of Patent: Jan. 25, 2022

(54) CUTTING INSERT AND SHOULDER MILLING TOOL

(71) Applicant: SANDVIK INTELLECTUAL PROPERTY AB, Sandviken (SE)

(72) Inventors: Thomas Eriksson, Falun (SE); Jorgen Jansson Udd, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 291 days.

(21) Appl. No.: 16/472,713

(22) PCT Filed: Nov. 10, 2017

(86) PCT No.: PCT/EP2017/078855
§ 371 (c)(1),
(2) Date: Jun. 21, 2019

(87) PCT Pub. No.: WO2018/114132
PCT Pub. Date: Jun. 28, 2018

(65) Prior Publication Data
US 2021/0129238 A1     May 6, 2021

(30) Foreign Application Priority Data

Dec. 22, 2016 (EP) .................................... 16206364

(51) Int. Cl.
*B23C 5/20* (2006.01)
*B23C 5/06* (2006.01)
*B23C 5/22* (2006.01)

(52) U.S. Cl.
CPC ............... *B23C 5/207* (2013.01); *B23C 5/06* (2013.01); *B23C 5/2221* (2013.01);
(Continued)

(58) Field of Classification Search
CPC ....... B23C 2200/0411; B23C 2200/128; B23C 2200/201; B23C 2200/205;
(Continued)

(56) References Cited

U.S. PATENT DOCUMENTS 4,093,392 A * 6/1978 Hopkins ............... B23C 5/2221
407/48
6,336,776 B1 * 1/2002 Noggle .................. B23C 5/202
407/114
(Continued)

FOREIGN PATENT DOCUMENTS

CN          1120324 A       4/1996
CN          1487863 A       4/2004
(Continued)

*Primary Examiner* — Nicole N Ramos
(74) *Attorney, Agent, or Firm* — Corinne R. Gorski

(57) ABSTRACT

A cutting insert and a shoulder milling tool are disclosed. The cutting insert includes a surface-wiping secondary cutting edge inclined in relation to a median plane of the cutting insert, such that a distance to the median plane decreases in a direction toward a corner cutting edge. A circumferential surface includes a clearance surface extending along a main cutting edge. The clearance surface along the main cutting edge extends at an acute angle to the median plane, such that the clearance surface forms a negative nominal clearance angle, and wherein the circumferential surface includes first and second abutment surfaces configured for abutment against axial and/or radial support surfaces of the milling tool, the abutment surfaces extending along at least part of the main cutting edge and the surface-wiping secondary cutting edge.

12 Claims, 7 Drawing Sheets

(52) U.S. Cl.
CPC .. *B23C 2200/125* (2013.01); *B23C 2200/208* (2013.01); *B23C 2200/28* (2013.01); *B23C 2210/168* (2013.01)

(58) Field of Classification Search
CPC ........ B23C 2200/208; B23C 2200/286; B23C 2210/16816; B23C 5/06; B23C 5/207; B23C 5/22; B23C 5/2221; B23B 2205/12; B23B 2205/00
See application file for complete search history.

(56) References Cited

U.S. PATENT DOCUMENTS

| | | |
|---|---|---|
| 2002/0122699 A1 | 9/2002 | Noggle |
| 2007/0071559 A1* | 3/2007 | Koskinen ................ B23B 27/16 407/34 |
| 2008/0232912 A1 | 9/2008 | Bhagath |
| 2014/0010605 A1 | 1/2014 | Smilovici et al. |
| 2015/0190869 A1* | 7/2015 | Roman .................... B23C 5/06 407/42 |
| 2017/0080503 A1* | 3/2017 | Koike .................... B23C 5/006 |

FOREIGN PATENT DOCUMENTS

| | | | | |
|---|---|---|---|---|
| EP | 2893995 A1 | 7/2015 | | |
| EP | 2998053 A1 | 3/2016 | | |
| WO | WO-2015117733 A1 * | 8/2015 | ............. | B23C 5/06 |
| WO | 2015174200 A1 | 11/2015 | | |
| WO | WO-2015198812 A1 * | 12/2015 | ............. | B23C 5/006 |
| WO | 2016046811 A1 | 3/2016 | | |

\* cited by examiner

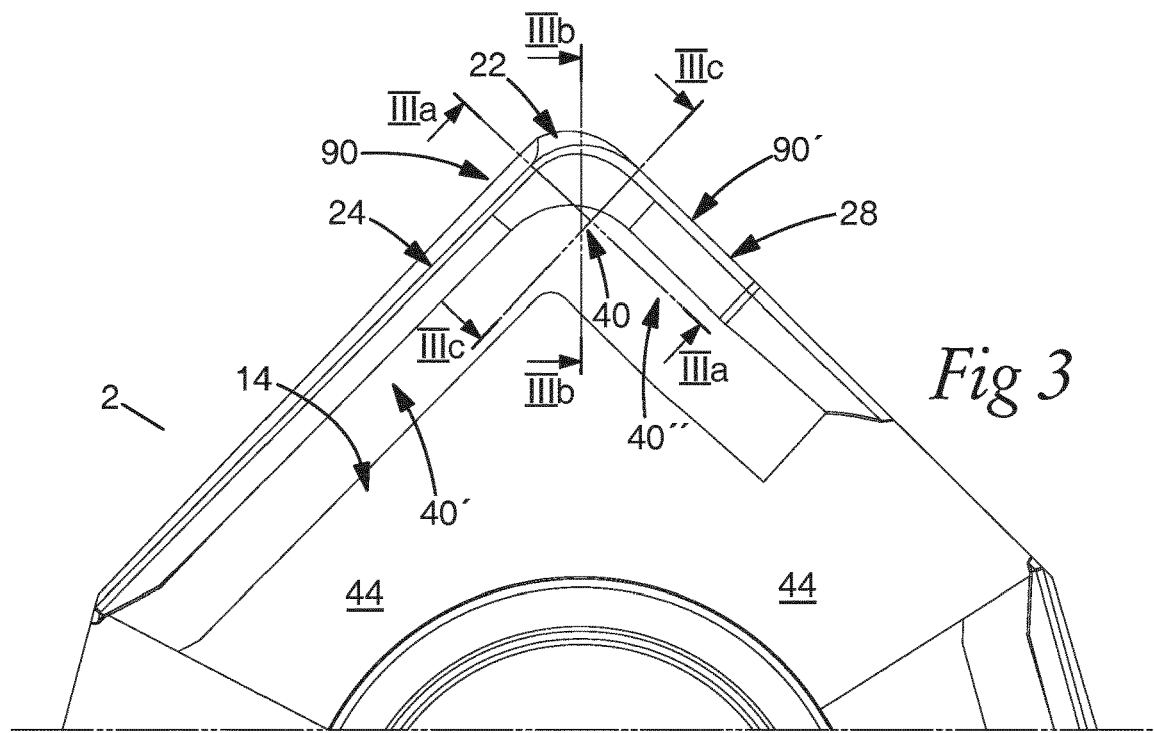
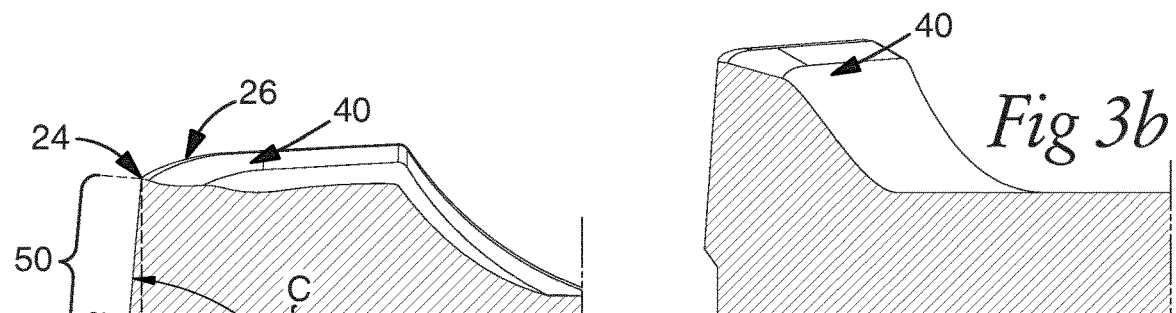
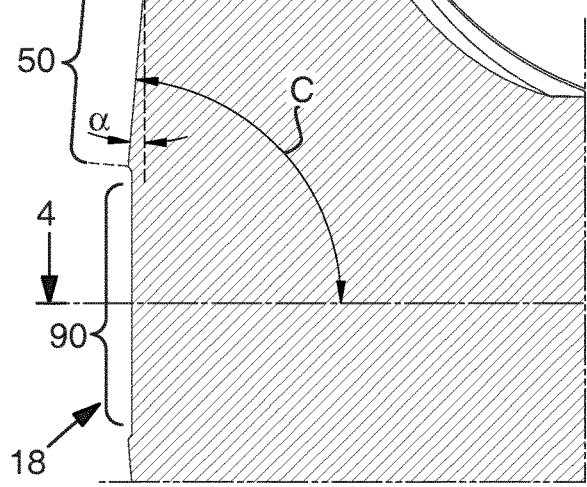
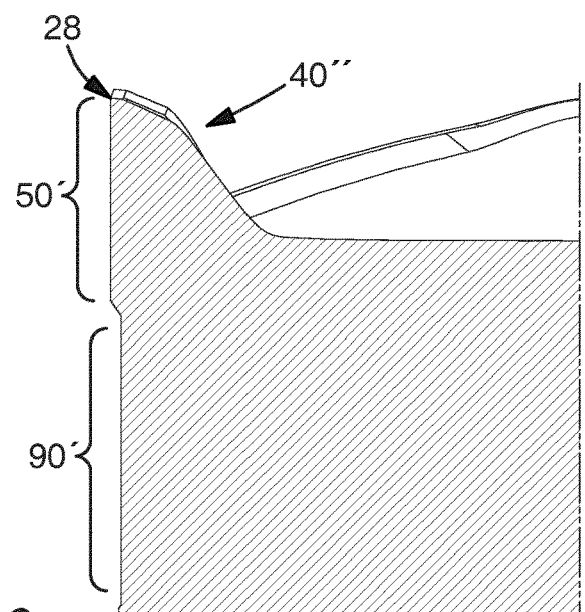

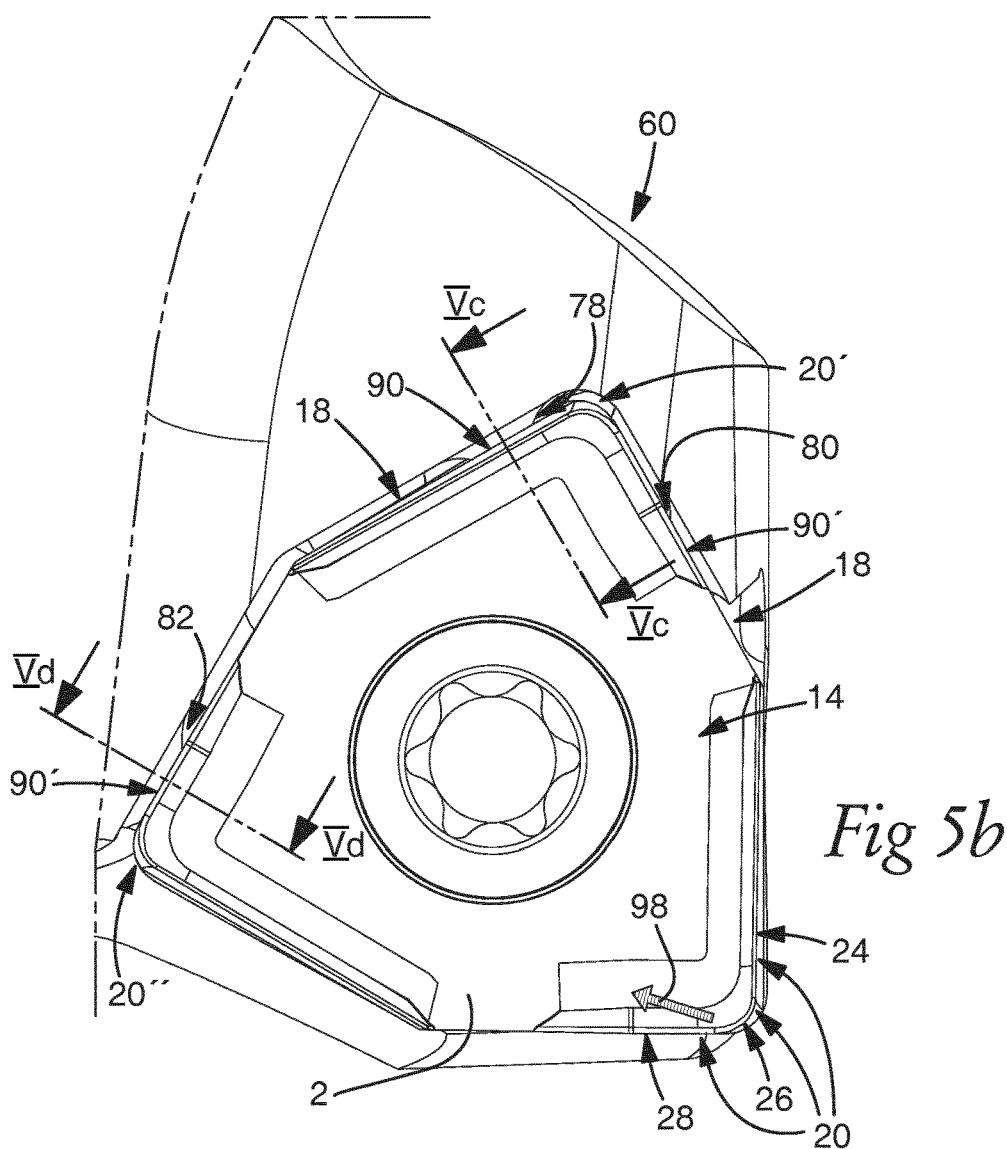
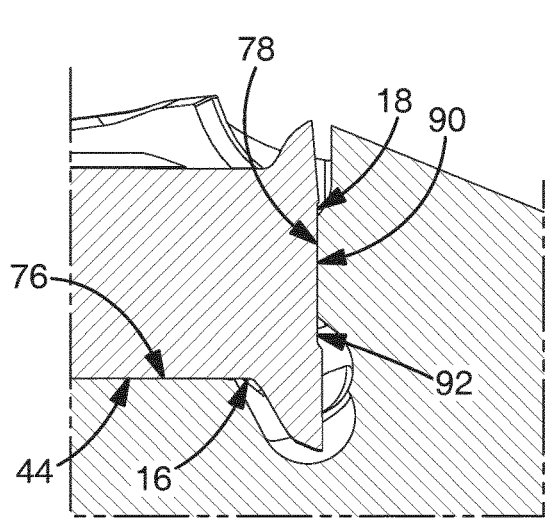
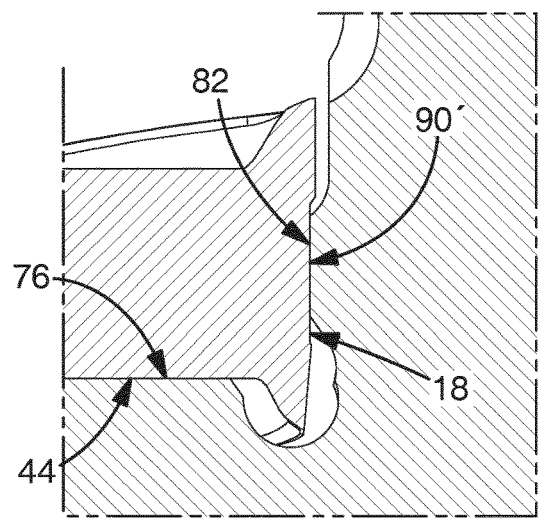
Fig 5b
Fig 5c
Fig 5d

CUTTING INSERT AND SHOULDER MILLING TOOL

RELATED APPLICATION DATA

This application is a § 371 National Stage Application of PCT International Application No. PCT/EP2017/078855 filed Nov. 10, 2017 with priority to EP 16206364.8 filed Dec. 22, 2016.

TECHNICAL FIELD

The present invention relates to a cutting insert for a shoulder milling tool. The present invention further relates to a shoulder milling tool.

BACKGROUND

One or more cutting inserts are secured to a shoulder milling tool. In milling operation, the shoulder milling tool is rotated and fed into a workpiece. A cutting edge of each of the one or more cutting inserts enters into cutting engagement for milling a shoulder in the workpiece.

Cutting inserts are available in various different shapes, some of which are indexable, i.e. they comprise more than one useable cutting edge and may be secured in different index positions to the shoulder milling tool. A cutting insert having a generally hexagonal shape comprising three 90 degree corners is referred to as a trigonally shaped cutting insert.

WO 2015/174200 discloses a trigonally shaped cutting insert comprising: a first surface and a second surface which each have a hexagonal shape and which are disposed back-to-back, lateral surfaces that run to the first surface and the second surface, and cutting edges that are respectively formed by a ridgeline at a position where the first surface and the lateral surfaces intersect, and by a ridgeline at a position where the second surface and the lateral surfaces intersect. Seat surfaces are disposed parallel and are respectively formed at the insert center side of the first surface and of the second surface; and depressions for separating the lateral surface that runs to the first surface and the lateral surface that runs to the second surface. The cutting edges are formed of a first cutting edge and a second cutting edge. The first cutting edge is longer than the second cutting edge. An end of the first cutting edge is in a position that is higher than the seat surface.

SUMMARY

It is an object of the present invention to provide a cutting insert for shoulder milling, which is configured for a stable support in the shoulder milling tool.

According to an aspect of the invention, the object is achieved by a cutting insert for a shoulder milling tool, the cutting insert having a trigonal shape and a median plane extending through the cutting insert. The cutting insert comprises a first surface an opposite second surface, and a circumferential surface extending between the first surface and the second surface, the first and second surfaces extending on opposite sides of the median plane. The cutting insert comprises three indexable cutting edges extending along an intersection between the first surface and the circumferential surface, wherein each indexable cutting edge, as seen in a view towards the first surface, is extending along a corner of the trigonally shaped cutting insert. Each indexable cutting edge comprises a main cutting edge, a corner cutting edge, and a surface-wiping secondary cutting edge, wherein the main cutting edge adjoins to the corner cutting edge, and the corner cutting edge adjoins to the surface-wiping secondary cutting edge. The surface-wiping secondary cutting edge is inclined in relation to the median plane such that the distance to the median plane decreases in a direction towards the corner cutting edge. The circumferential surface comprises a clearance surface extending along the main cutting edge, wherein the clearance surface along the main cutting edge extends at an acute angle to the median plane, such that the clearance surface is forming a negative nominal clearance angle. The circumferential surface comprises a first abutment surface configured for abutment against an axial and/or radial support surface of the shoulder milling tool, the first abutment surface extending along at least part of the main cutting edge. The circumferential surface comprises a second abutment surface configured for abutment against an axial and/or radial support surface of the shoulder milling tool, the second abutment surface extending along at least a part of the surface-wiping secondary edge.

Since the surface-wiping secondary cutting edge is inclined in relation to the median plane such that the distance to the median plane decreases in a direction toward the corner cutting edge, during use of the cutting insert in a shoulder milling tool, cutting forces at the surface-wiping secondary cutting edge comprise a force component directed inwardly into an insert seat of the shoulder milling tool and radially towards a rotation axis of the shoulder milling tool. Moreover, since the clearance surface along the main cutting edge forms a negative nominal clearance angle and the circumferential surface comprises a first abutment surface at the main cutting edge, the first abutment surface, when the cutting insert is arranged in the shoulder milling tool with the first abutment surface abutting against a side support surface of the shoulder milling tool, abuts a farther distance from a centre of the cutting insert than if the clearance surface would be arranged with a neutral or positive nominal clearance angle, proving a larger holding moment for the cutting insert mounted in the shoulder milling tool than would otherwise be the case. Thus, the cutting insert is stably/firmly supported in the insert seat of the shoulder milling tool.

Furthermore, since the clearance surface is forming a negative nominal clearance, the circumferential surface can form a relatively larger abutment area (width and length) on the abutment surface due to it being formed at a relatively larger so called inscribed circle or IC on the cutting insert than a corresponding cutting insert having neutral or positive nominal clearance on the clearance surface, whereby the abutment surface would be formed at a relatively smaller inscribed circle or IC on the cutting insert. More precisely, since the clearance surface along the main cutting edge forms a negative nominal clearance angle, the second abutment surface, along the adjacent surface-wiping secondary cutting edge of the relevant cutting edge, is larger than on a corresponding cutting insert having neutral or positive nominal clearance angle on the clearance surface along the main cutting edge. That is, the second abutment surface, along the adjacent surface-wiping secondary cutting edge, is longer along a direction in parallel with the median plane in the extension toward the corner cutting edge interposed between the main cutting edge and the surface-wiping secondary cutting edge of each indexable cutting edge. Accordingly, when the cutting insert is arranged in the shoulder milling tool with the portion of the second abutment surface at the surface-wiping secondary cutting edge abutting against a side support surface of the shoulder milling tool, the portion of the second abutment surface has an increased extension in the direction towards/below the interposed corner cutting edge and also abuts a farther distance from a centre of the cutting insert than if the clearance surface would be arranged with a neutral or positive nominal clearance angle, whereby it's possible to provide a larger spacing between the support surfaces in the shoulder milling tool—by locating for instance a radially innermost side support surface on the shoulder milling tool more axially outward—and a larger holding moment for the cutting insert mounted in the shoulder milling tool than would otherwise be the case. This also contributes to the cutting insert being stably/firmly supported in the insert seat of the shoulder milling tool.

The first and second abutments surfaces are preferably configured for said abutment by being flat. In this way the abutment surfaces provide a well-defined shape for a reliable abutment against the axial/radial support surfaces. The flat shape on the abutment surfaces is also suitable for facilitating a grinding of the abutment surfaces in the manufacturing of the cutting insert, whereby improved precision in the support as well as localization of the cutting insert in the shoulder milling tool can be achieved.

The cutting insert is fixed in a seat of a shoulder milling tool. A shoulder milling tool is configured for cutting a 90° shoulder in a workpiece. Some shoulder milling tools may also be used for ramping and plunge milling, i.e. for feeding in an axial direction of the shoulder milling tool into the workpiece. The median plane is an imaginary plane extending centrally in between the first and second surfaces and intersects with the circumferential surface. The main cutting edge is extending in the axial direction of the shoulder milling tool and configured for cutting the 90° shoulder or wall in the workpiece, in relation to the surface-wiping secondary cutting edge, which is extending in the radial direction of the shoulder milling tool and configured for surface-wiping the workpiece surface extending perpendicularly to the axial direction of the shoulder milling tool. The trigonal shape of the cutting insert for the shoulder milling tool provides three indexable cutting edges extending along the intersection between the first surface and the circumferential surface, each of the three cutting edges extending along a 90 degree corner of the insert. The cutting insert is preferably a double-sided cutting insert with three further indexable cutting edges extending along an intersection between the second surface and the circumferential surface. In other words, the double-sided trigonal shape can advantageously provide a total of six indexable cutting edges to be used for shoulder milling.

According to an embodiment, the circumferential surface comprises a circumferential countersunk waist portion situated at the median plane, wherein the first and second (flat) abutment surfaces are formed in the circumferential countersunk waist portion. In this manner the (flat) abutment surface is countersunk in relation to the clearance surfaces and positioned at the median plane to provide a stable support of the cutting insert in the insert seat of the shoulder milling tool. The countersunk waist isolates the (flat) abutment surfaces from the clearance surfaces and protects the (flat) abutment surfaces from wear during milling in order to keep them intact for the indexing of the cutting insert.

According to an embodiment, the surface-wiping secondary cutting edge extends at an average angle within a range of 1-6 degrees to the median plane, or at an average angle within a range of 2-5 degrees to the median plane, or at an at average angel of 3.5 degrees to the median plane. An average angle within the above mentioned ranges, or of 3.5 degrees to the median plane provides a suitable force component directed inwardly into the insert seat of a shoulder milling tool during milling.

According to an embodiment, the first surface comprises a flat centre surface transforming into an inclined main rake face adjacent to the main cutting edge, wherein the entire main cutting edge and the inclined main rake face extend at a greater distance from the median plane than the flat centre surface. Since the entire main cutting edge and the main rake surface extend at a greater distance from the median plane than the flat centre surface, the cutting chips are easily formed along the main cutting edge. Cutting chips will be directed downwardly from the main cutting edge and the main rake surface towards the flat centre surface. No countersunk chip breakers in relation to the centre surface or no substantial directional change is required in forming the curled chips travelling from the main cutting edge towards the flat centre surface, and thus, the chip flow from the main cutting edge will be formed and flow substantially unimpeded along the first surface.

According to an embodiment, the first surface comprises a flat centre surface transforming into an inclined secondary rake face adjacent to the surface-wiping secondary cutting edge, and wherein the entire surface-wiping secondary cutting edge and the inclined secondary rake face is arranged at a greater distance from the median plane than the flat centre surface. In this manner substantial directional changes for forming the chips from the surface-wiping secondary cutting edge are avoided and no chip breaker is required.

According to an embodiment, the cutting insert is a double-sided cutting insert with three further indexable cutting edges extending along an intersection between the second surface and the circumferential surface. Each of the first and second surfaces comprises a flat centre surface for abutment against a bottom support surface of a shoulder milling tool. In this manner, a six time indexable cutting insert may be provided with a beneficially large flat centre surface for secure/stable support against a bottom support surface in the insert seat of the shoulder milling tool.

According to an embodiment, the main cutting edge is inclined in relation to the median plane such that a distance to the median plane decreases in a direction away from the corner cutting edge. Due to such positive inclination of the main cutting edge, during use of the cutting insert in the shoulder milling tool, the main cutting edge will first engage with a workpiece closest to the corner cutting edge and thereafter gradually enter with the remaining parts of the main cutting edge, even when the insert is mounted at a negative axial rake angle in the shoulder milling tool. Thus, cutting chips are cut from the workpiece by the main cutting edge in a direction from the corner cutting edge and away there from along the positively inclined main cutting edge to provide smooth cutting action. It also provides a beneficial axial chip flow/evacuation in the shoulder milling tool.

According to an embodiment, the main cutting edge extends at an average angle within a range of 6-14 degrees to the median plane, or at an average angle within a range of 9-11 degrees to the median plane, or at an angle of 9.5 degrees to the median plane. An average angle within the above mentioned ranges, or of 9.5 degrees to the median plane provides a suitable gradual engagement of the main cutting edge from the corner cutting edge and away therefrom along the main cutting edge for smooth cutting action and axial chip flow/evacuation in the shoulder milling tool.

According to an embodiment, the clearance surface along the main cutting edge extends at an acute angle within a range of 83-87 degrees to the median plane. In this manner, a negative nominal clearance angle within a range of 3-7 degrees is provided.

It is a further object of the present invention to provide a shoulder milling tool with a stably supported cutting insert arranged in an insert seat of the shoulder milling tool.

According to a further aspect of the invention, this object is achieved by a shoulder milling tool comprising a tool body being provided with an insert seat for receiving a cutting insert. The shoulder milling tool comprises a cutting insert according to any one of aspects and/or embodiments discussed herein arranged in the insert seat.

According to an embodiment, the insert seat is provided with a bottom support surface, a first side support surface, a second side support surface, and a third side support surface. The insert seat comprises a radial opening for exposing the main cutting edge of the cutting insert and an axial opening for exposing the surface-wiping secondary cutting edge of the cutting insert. The first side support surface, the second side support surface, and the third side support surface are extending transverse to the bottom support surface. The first and second side support surfaces are arranged to support the first and second abutment surfaces of an inactive indexable cutting edge at a first end of the insert seat opposite to the axial opening, and the third side support surface is arranged to support the second abutment surface of another inactive indexable cutting edge at a second end of the insert seat close to the axial opening. The cutting insert is arranged with the second surface abutting against the bottom support surface. In this manner, the cutting insert is stably supported in the insert seat by the four different support surfaces of the insert seat.

According to an embodiment, the insert seat is configured to provide a negative axial rake angle for the median plane of the cutting insert arranged in the insert seat. The insert seat is hereby configured to provide a negative axial rake angle within a range of 1-11 degrees, or within a range of 4-8 degrees, or of 6 degrees. Such negative axial rake angle provides a suitable axial tilting of the cutting insert.

According to an embodiment, the insert seat is configured to provide a negative radial rake angle for the median plane of the cutting insert arranged in the insert seat. The insert seat is configured to provide a negative radial rake angle within a range of 8-20 degrees, or within a range of 11-17 degrees, or of 14 degrees. In this manner, one force component of cutting forces acting on the surface-wiping secondary cutting edge will push the cutting insert into the insert seat.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which:

FIG. 3 illustrates a top view of the cutting insert of FIGS. 1a-1d, FIGS. 3a-3c illustrate three partial cross sections through the cutting insert along lines IIIa-IIIa, IIIb-IIIb, and IIIc-IIIc in FIG. 3, FIGS. 4a and 4b illustrate a shoulder milling tool according to an embodiment, FIG. 5b illustrates a cutting insert secured in the insert seat shown in FIG. 5a, FIG. 5c illustrates a cross-section through the shoulder milling tool along line Vc-Vc in FIG. 5a, and FIG. 5d illustrates a cross-section through the shoulder milling tool along line Vd-Vd in FIG. 5a.

DETAILED DESCRIPTION

Figure 1A:
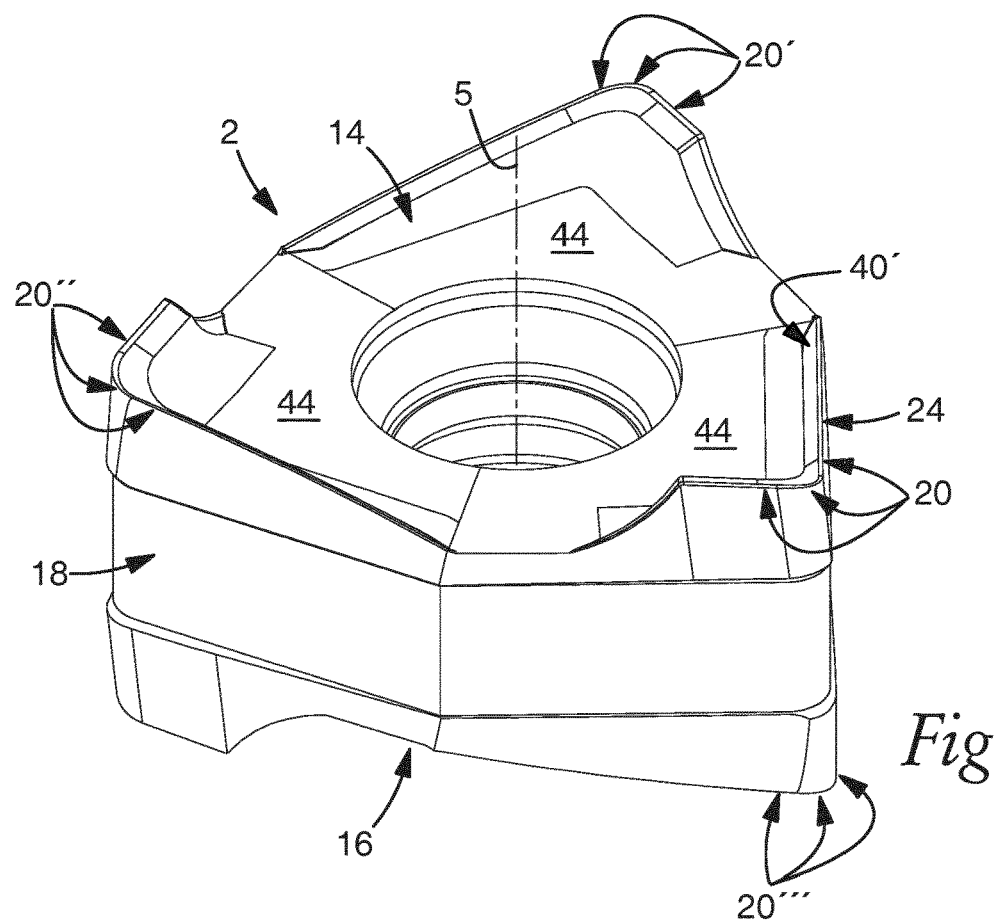
FIGS. 1a-1d illustrate various views of a cutting insert according to an embodiment.

Aspects of the present invention will now be described more fully. Like numbers refer to like elements throughout. Well-known functions or constructions will not necessarily be described in detail for brevity and/or clarity.

FIGS. 1a-1d illustrate various views of a cutting insert 2 according to an embodiment. The cutting insert 2 is configured for use in a shoulder milling tool. However, the cutting insert 2 may also be used for plunge milling. The cutting insert 2 is double-sided and six times indexable, i.e. the cutting insert 2 comprises six identical cutting edges in total, such that the cutting insert 2 can be mounted in six different index positions in the shoulder milling tool, to provide one active cutting edge at a time for milling a workpiece. The cutting insert 2 comprises a through hole 3 for screw mounting the cutting insert to the shoulder milling tool, the through hole 3 extending centrally through the cutting insert 2.

The cutting insert 2 is preferably manufactured from a cemented carbide material, but it may be manufactured from a material comprising e.g. one or more of ceramics, cubic boron nitride, polycrystalline diamond, and/or cermet. The cutting insert 2 is also preferably coated with surface coatings such as e.g. titanium nitride, titanium carbonitride, and/or aluminium oxide.

The cutting insert 2 has a trigonal shape and an imaginary median plane 4 extending through the cutting insert 2. The median plane 4 extends perpendicularly to a centre axis 5 of the through hole 3. FIG. 1d shows a cross section through the insert 2, along the median plane 4. Seen in a view towards the median plane 4, the trigonal shape has three approximately 90 degree angled corners 6 and three approximately 150 degree angled corners 8 in between the approximately 90 degree angled corners 6. An approximately 60 degree angle 10 is formed between sides 12 of two different approximately 90 degree angled corners 6.

The actual angles of a cutting insert may vary due to manufacturing tolerances. Some surfaces are formed in pressing and sintering operations of manufacturing the cutting insert, other surface are ground after the sintering operation. Thus, angles between surface, edges, and/or planes may have different manufacturing tolerances.

Herein various angles are discussed as being approximately a number of degrees. In practice, the number of degrees in an actual cutting insert may depend on a particular finally chosen layout of a particular embodiment of the cutting insert. The approximate angle may vary a few degrees from the figure given, such as e.g. +/−5 degrees, or +/−3 degrees. The advantages of different aspects and/or embodiments of the invention are present within such angular ranges. Accordingly, the above mentioned approximately 90 degree angled corners may encompass corner angles within a range of 85-95 degrees, the approximately 150 degree angled corners may encompass corner angles within a range of 145-155 degrees, and the approximately 60 degree angles may encompass angles within a range of 55-65 degrees.

The insert 2 comprises a first surface 14, and a second surface 16 opposite to the first surface 14, and a circumferential surface 18 extending between the first surface 14 and the second surface 16. The first and second surfaces 14, 16 extend on opposite sides of the median plane 4. The median plane 4 extends centrally in between the first and second surfaces 14, 16 and intersects with the circumferential surface 16. Put differently, the median plane 4 extends in the middle of the insert 2 with one half of the insert 2 on each side of the median plane 4.

The through hole 3 extends through the insert from the first surface 14 to the second surface 16. Each of the first and second surfaces 14, 16 as a trigonal shape corresponding substantially to the trigonal shape of the median plane 4 discussed above with reference to FIG. 1d. Corners of the median plane 4 and the first and second surface 14, 16 are substantially aligned.

A cutting edge 20 extends along an intersection between the first surface 14 and the circumferential surface 18. The cutting edge 20, as seen in a view towards the first surface 14, see FIG. 1b, extends along a corner 22 of the insert 2. The corner 22 is an approximately 90 degree corner and is arranged at one of the approximately 90 degree corners 6 of the median plane 4 shown in FIG. 1d. The corner 22 seen in the view of FIG. 1b may have a cutting insert corner radius for forming a standard corner radius in a workpiece, such as a radius of e.g. 0.8 mm, 1.2 mm, or 1.6 mm. The cutting edge 20 comprises three portions; a main cutting edge 24, a corner cutting edge 26, and a surface-wiping secondary cutting edge 28. The main cutting edge 24 adjoins to the corner cutting edge 26, and the corner cutting edge 26 adjoins to the surface-wiping secondary cutting edge 28.

When arranged in a shoulder milling tool, the main cutting edge 24 is extending in an axial direction of the shoulder milling tool and arranged for cutting into a workpiece, in a radial direction of the shoulder milling tool. The surface-wiping secondary cutting edge 28 is extending in a radial direction of the shoulder milling tool and configured for cutting into the workpiece, in an axial direction of the shoulder milling tool. An approximately 90° shoulder is milled in a workpiece during shoulder milling. During plunge milling, cutting in an axial direction of the milling tool into the workpiece is performed. In a shoulder milling operation, the main cutting edge 24 performs a major cut into the workpiece, while the surface-wiping secondary cutting edge 28 only performs a shallow surface smoothing cut. During plunge milling the surface-wiping secondary cutting edge 28 performs a deeper cut into the workpiece, in the axial direction of the shoulder milling tool, than during a shoulder milling operation. During plunge milling the main cutting edge 24 may also perform a substantial cut into the workpiece.

Figure 1B:
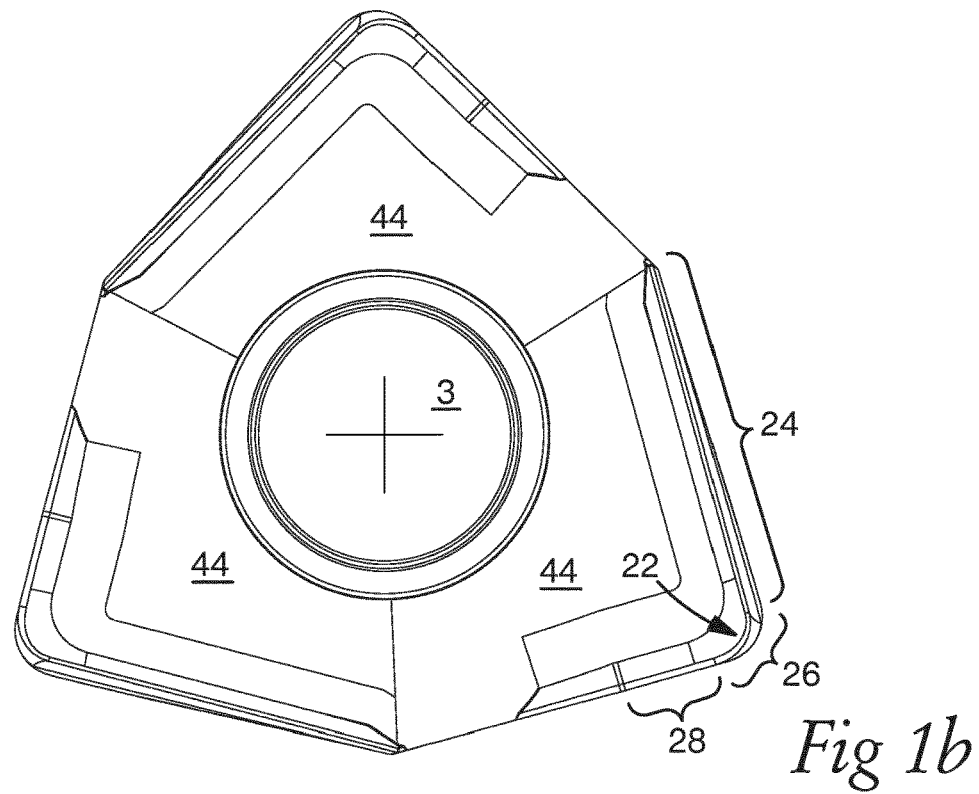
Figure 1C:
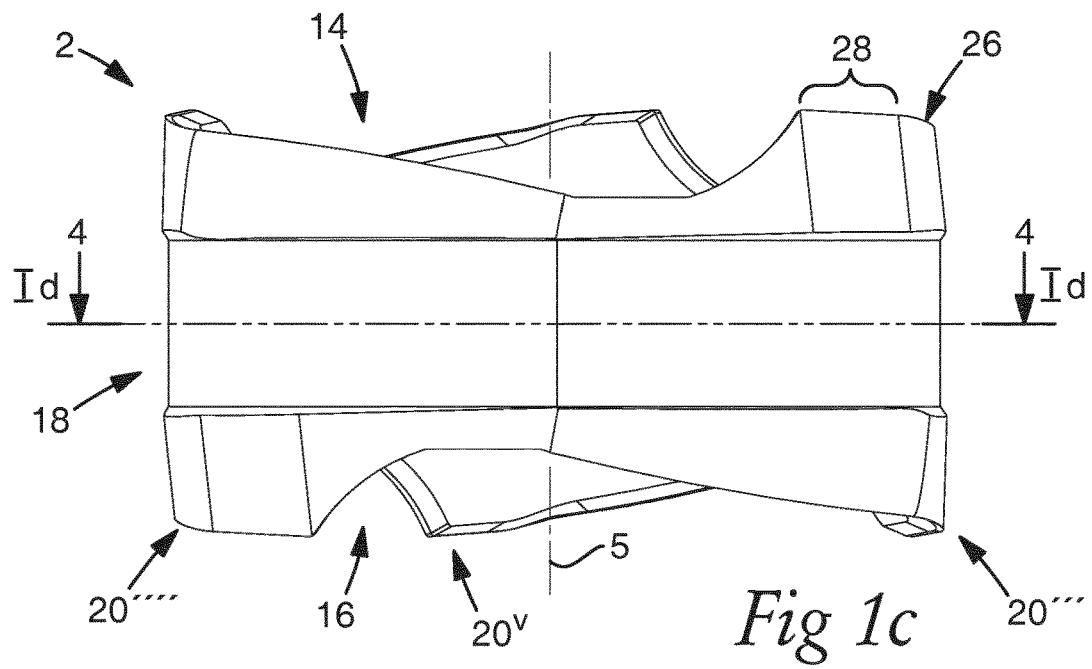
Figure 1D:
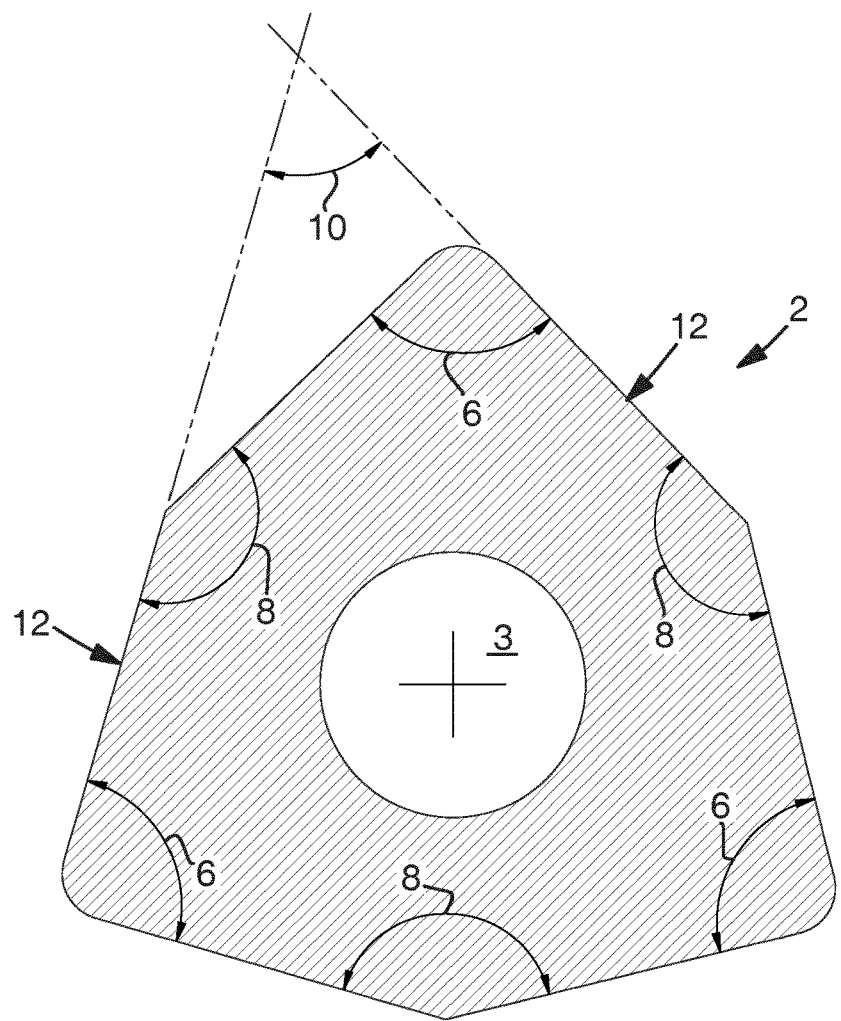
Figure 2A:
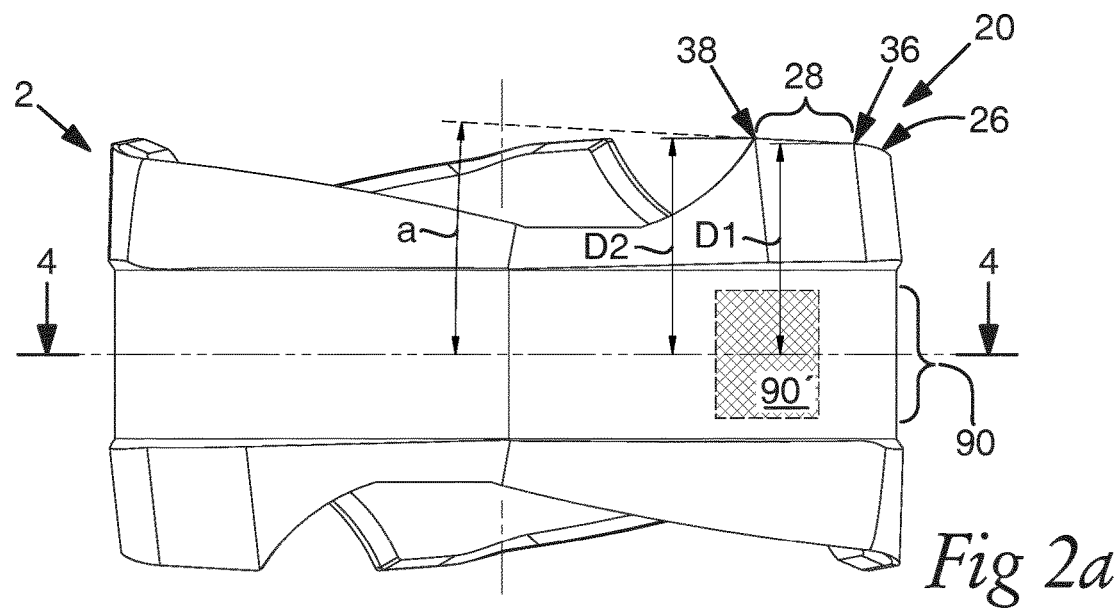
FIGS. 2a and 2b illustrate two views of the cutting insert of FIGS. 1a-1d.
Figure 2B:
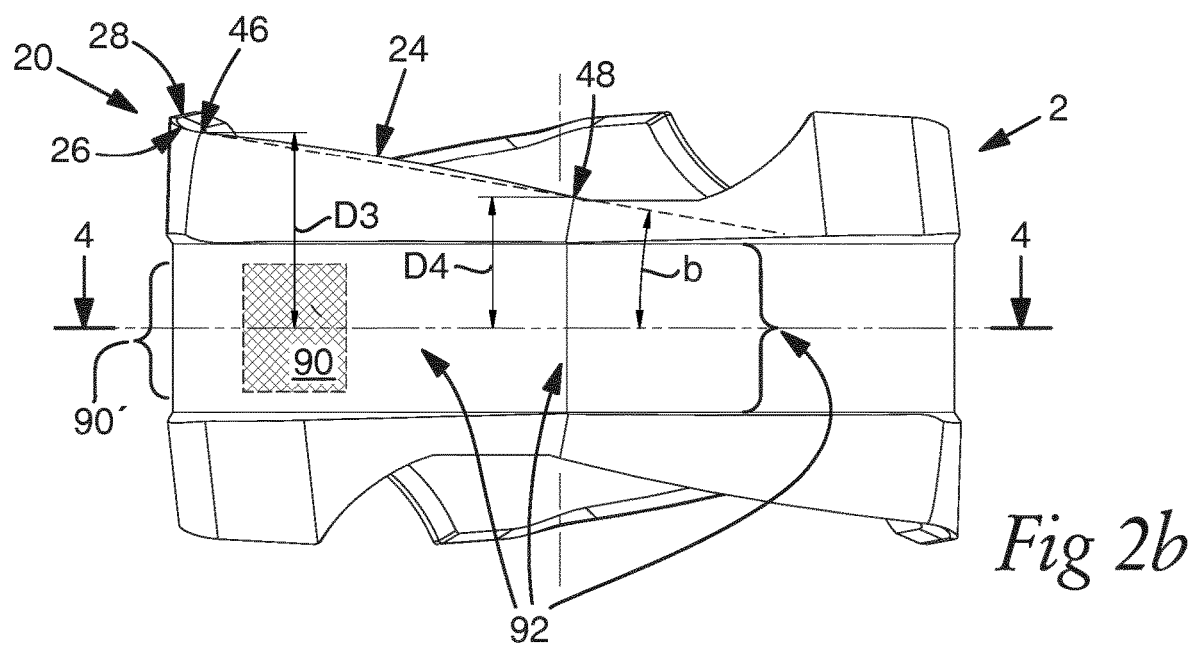

FIGS. 2a and 2b illustrate views of the cutting insert 2 of FIGS. 1a-1d. In particular, the cutting edge 20 is shown along the median plane 4 from two different sides of the cutting insert 2.

The surface-wiping secondary cutting edge 28 is inclined in relation to the median plane 4 such that a distance to the median plane 4 decreases in a direction toward the corner cutting edge 26. Accordingly, and as illustrated in FIG. 2a, close to the corner cutting edge 26 a first distance D1 between the surface-wiping secondary cutting edge 28 and the median plane 4 is shorter than a second distance D2 between the surface-wiping secondary cutting edge 28 and the median plane 4 farther away from the corner cutting edge 26. Due to such inclination of the surface-wiping secondary cutting edge 28, during use of the cutting insert 2 in a shoulder milling tool, cutting forces at the surface-wiping cutting edge 28 comprise a force component directed inwardly into an insert seat of the shoulder milling tool and radially towards a rotation axis of the shoulder milling tool. Such a force component contributes to stably positioning the cutting insert 2 in the insert seat, see also below with reference to FIG. 5b.

According to the shown embodiment, as illustrated in FIG. 2a, the surface-wiping secondary cutting edge 28 extends at an average angle a within a range of 1-6 degrees to the median plane 4, or at an average angle a within a range of 2-5 degrees to the median plane 4, or at an at average angel a of 3.5 degrees to the median plane 4. An average angle a within the above mentioned ranges, or of approximately 3.5 degrees to the median plane 4 provides a force component directed inwardly into the insert seat during user of the cutting insert 2. The average angle a may be defined by an angle between the median plane 4 and a line extending between an intersection 36 between the corner cutting edge 26 and the surface-wiping secondary cutting edge 28 and an end 38 of the surface-wiping secondary cutting edge 28 opposite to the corner cutting edge 26. The surface-wiping secondary cutting edge 28 may be slightly curved.

Mentioned purely as an example, the surface-wiping secondary cutting edge 28 may have a length of approximately 1.3 mm and may be curved with a radius of approximately 330 mm, seen in the view of FIG. 2a. The angle between a tangent of the surface-wiping secondary cutting edge 28 and the median plane 4 may be 3.6 degrees close to the corner cutting edge 26 and 3.4 degrees farthest away from the corner cutting edge 26, resulting in an average angel a of approximately 3.5 degrees. FIG. 3 illustrates a partial top view of the cutting insert 2 of FIGS. 1a-1d. FIGS. 3a-3c illustrate three partial cross sections through the cutting insert 2 along lines IIIa-IIIa, IIIb-IIIb, and IIIc-IIIc in FIG. 3. Referring to FIG. 3a, the circumferential surface 18 comprises a first clearance surface 50 extending along the main cutting edge 24. The first clearance surface 50 along the main cutting edge 24 extends at an acute angle c to the median plane 4, such that the clearance surface 50 along the main cutting edge 24 is forming a negative nominal clearance angle α. In this manner the cutting insert 2 is wider at the median plane 4 than a cutting insert having a positive nominal clearance angle. According to some embodiments, the cutting insert 2 may be wider at the median plane 4 than at the main cutting edge 24. The circumferential surface 18 comprises a second clearance surface 50' extending along the surface-wiping secondary cutting edge 28. The second clearance surface 50' along the surface-wiping secondary cutting edge 24 extends at a neutral angle to the median plane 4, such that the second clearance surface 50' forms a 0 degree nominal clearance angle. The nominal clearance angle is the clearance angle of the clearance surface 50, 50' measured on the cutting insert 2 as such, in relation to a normal of the median plane 4. A functional clearance angle is formed when the cutting insert 2 is secured to a shoulder milling tool, see FIGS. 4a and 4b. The functional clearance angle is always positive and constitutes the clearance angle between the clearance surface of the cutting insert and the machined workpiece surface during operation of the shoulder milling tool.

The circumferential surface 18 comprises a first flat abutment surface 90, and a second flat abutment surface 90'. Each of the first and second flat abutment surfaces 90, 90' is configured for abutment against an axial and/or radial side support surface of the shoulder milling tool, see below with reference to FIGS. 5a-5d. The first flat abutment surface 90 is arranged at a distance from the main cutting edge 24, and extends along at least part of the main cutting edge 24. The second flat abutment surface 90' is arranged at a distance from the surface-wiping secondary cutting edge 28 and along at least part of the surface-wiping secondary cutting edge 28.

Side support surfaces of the insert seat of the shoulder milling tool will axially and radially support the cutting insert 2 by abutting against the flat abutment surfaces 90, 90' of the circumferential surface 18 in the area of the median plane 4. The cutting insert 2 being relatively wide in the median plane 4 and the first and second flat abutment surfaces 90, 90' being arranged in the circumferential surface 18 at the median plane 4 ensure that the cutting insert 2 is supported in the insert seat of the shoulder milling tool, against the first and second flat abutment surfaces 90, 90', a far distance from a centre of cutting insert 2. Thus, the moment of a force, i.e. torque, applied at each of the first and second flat abutment surfaces 90, 90', resulting from cutting forces and from clamping forces when securing the cutting insert 2 in the insert seat may be relatively large. This in turn contributes to a stable support of the cutting insert 2 in the insert seat.

Similarly, since the clearance surface 50 along the main cutting edge 24 extends at the acute angle c to the median plane 4, such that the clearance surface 50 along the main cutting edge 24 is forming a negative nominal clearance angle α, the second flat abutment surface 90' of the circumferential surface 18, along the adjacent surface-wiping secondary cutting edge 28, can be made longer along a direction in parallel with the median plane 4 in the extension toward the corner cutting edge 26 interposed between the main cutting edge 24 and the surface-wiping secondary cutting edge 28. Thus, the second flat abutment surface 90' is also supported in the insert seat of the shoulder milling tool, a far distance from a centre of cutting insert 2. Accordingly, also the moment of a force, i.e. torque, applied at the second flat abutment surface 90' adjacent to the surface-wiping secondary cutting edge 28, resulting from cutting forces and from clamping forces when securing the cutting insert 2 in the insert seat may be large. Again, this in turn contributes to a stable support of the cutting insert 2 in the insert seat.

The circumferential surface 18 comprises a circumferential waist portion 92 situated at the median plane 4, wherein the first and second flat abutment surfaces 90, 90' are formed in the circumferential waist portion 92, see FIG. 2b. The circumferential waist portion 92 is positioned farther away from a centre of the cutting inset 2, at least in an area of the main cutting edge 24 due to the negative nominal clearance angle of the main cutting edge 24, than in a cutting insert where there is instead a neutral or positive nominal clearance angle at the main cutting edge. Furthermore, a stable support of the insert 2 having well protected first and second flat abutment surfaces 90, 90' is provided in the insert seat of the shoulder milling tool. In FIGS. 2a and 2b an example of the first and second abutment surfaces 90, 90' is indicated with hatchings. The first and second abutment surfaces 90, 90' form part of the waist portion 92 and in practice, the first and second abutment surfaces 90, 90' may not be distinguishable from a remainder of the waist portion 92. The waist portion 92 is countersunk or forms a recess in the insert at the median plane 4, in an area of the first flat abutment surface 90. In the illustrated embodiments, the countersunk waist portion 92 also forms a recess in the insert at the median plane 4, in an area of the second flat abutment surface 90'. In other words, the first and second flat abutment surfaces 90, 90' along the main cutting edge 28 and surface-wiping secondary cutting edge 28 are countersunk in relation to both the first and the second clearance surfaces 50, 50'.

The countersunk waist portion 92 provides flat abutment surfaces 90, 90', which are isolated/recessed in relation to the clearances surfaces 50, 50' in order to keep them intact during use of the cutting insert 2 and prevent detrimental wear of the abutment surfaces that may jeopardize a stable support when indexing the cutting insert into a new position, see also FIGS. 5b-5d.

According to the shown embodiment, the clearance surface 50 along the main cutting edge 24 extends at an acute angle c within a range of 83-87 degrees to the median plane 4. In this manner a negative nominal clearance angle α within a range of 3-7 degrees is provided. More precisely, according to the embodiment, the negative nominal clearance angle α along the main cutting edge 24 is 5 degrees, i.e. the acute angle c is approximately 85 degrees along the entire main cutting edge 24.

Referring to FIGS. 1a, 1b, and 3, the first surface 14 comprises a flat centre surface 44 transforming into an inclined main rake face 40' adjacent to the main cutting edge 24, wherein the entire main cutting edge 24 and the inclined main rake face 40' extend at a greater distance from the median plane 4 than the flat centre surface 44. Since the entire main cutting edge 24 and the main rake surface 40' extends at a greater distance from the median plane 4 than the flat centre surface 44, the cutting chips are easily formed along the main cutting edge 24. Cutting chips will be directed downwardly from the main cutting edge 24 and the main rake surface 40' towards the flat centre surface 44. No countersunk chip breakers in relation to the centre surface or no substantial directional change is required in forming the curled chips travelling from the main cutting edge 24 towards the flat centre surface 44, and thus, the chip flow from the main cutting edge 24 will be formed and flow substantially unimpeded along the first surface 14. Since no chip breaker is required on the first surface 14, the flat centre surface 44 may form a larger portion of the first surface 14. At least a portion of the flat centre surface 44 forms an abutment surface when the double sided cutting insert 2 is turned upside down with the first surface 14 facing an insert seat of a shoulder milling tool. Accordingly, when the flat centre surface 44 abuts against a support surface in an insert seat of a shoulder milling tool, e.g. as discussed below with reference to FIGS. 5a-5c, a more stable support of the cutting insert 2 in the insert seat may be provided. Suitably, a radially outer portion of the flat centre surface 44 forms an abutment surface against a bottom support surface in the insert seat of the shoulder milling tool.

Referring to FIGS. 3-3c, the first surface 14 comprises a flat centre surface 44 transforming into an inclined secondary rake face 40" adjacent to the surface-wiping secondary cutting edge 28, and wherein the entire surface-wiping secondary cutting edge 28 and the inclined secondary rake face 40" is arranged at a greater distance from the median plane 4 than the flat centre surface 44. In this manner substantial directional changes for forming the chips from the surface-wiping secondary cutting edge 28 are avoided and no chip breaker is required, and the flat centre surface 44 may form a relatively larger portion of the first surface 14, in a manner corresponding to the arrangement of the inclined main rake face 40' and the main cutting edge 24.

The flat centre surface 44 may extend in parallel with the median plane 4, or the flat centre surface 44 may be slightly slanted towards the through hole 3, i.e. have a general slightly concave or conical shape in order to secure a stable support/abutment at the periphery of the flat centre surface 44 (i.e. prevent unstable support around the screw hole). During manufacturing of the insert 2, the flat centre surface 44 cannot be subjected to a grinding operation due to the raised cutting edges 20-20" and will inevitably include deviations from a strictly flat surface due to manufacturing tolerances. Such manufacturing tolerances will typically give rise to an unevenness that does not exceed a 0, 2 mm variation seen within an area of 1 cm2 of the flat centre surface, apart from any general concave/conical shape of the flat centre surface 44. Such unevenness emanates from a manufacturing process of the cutting insert 2 involving pressing and sintering, which may also cause the slightly convex shape around the through hole 3, unless this is compensated for in a pressing tool for pressing the cutting insert prior to sintering the cutting insert.

Referring to FIGS. 1*a*-1*d*, the cutting insert 2 is a double-sided cutting insert with three further indexable cutting edges 20''', 20'''', 20$^V$ extending along an intersection between the second surface 16 and the circumferential surface 18. Each of the first and second surfaces 14, 16 comprising a flat centre surface 44 for abutment against a bottom support surface of a shoulder milling tool, see also below with reference to FIGS. 5*a*-5*c*. In FIGS. 1*a* and 1*b* only the flat centre surface 44 of the first surface 14 is shown. The second surface 16 comprises a corresponding flat centre surface.

Referring to FIG. 2*b*, the main cutting edge 24 is inclined in relation to the median plane 4 such that a distance to the median plane 4 decreases in a direction away from the corner cutting edge 26. Accordingly, and as illustrated in FIG. 2*b*, close to the corner cutting edge 26 a third distance D3 between the main cutting edge 24 and the median plane 4 is longer than a fourth distance D4 between the main cutting edge 24 and the median plane 4 farther away from the corner cutting edge 26. Due to such positive inclination of the main cutting edge 24, the main cutting edge 24 will first engage with a workpiece closest to the corner cutting edge 26 and thereafter gradually enter with the remaining parts of the main cutting edge 24, even when the insert 2 is mounted at a negative axial rake angle in the shoulder milling tool. Thus, cutting chips are cut from the workpiece by the main cutting edge 24 in a direction from the corner cutting edge 26 and away there from along the positively inclined main cutting edge 24 to provide smooth cutting action and axial chip flow/evacuation (i.e. in a direction along a central rotation axis of the shoulder milling tool).

According to the shown embodiment, the main cutting edge 24 extends at an average angle b within a range of 6-14 degrees to the median plane 4, or at an average angle b within a range of 9-11 degrees to the median plane 4, or at an angle b of 9.5 degrees to the median plane 4. An average angle b within the above mentioned ranges, or of approximately 9.5 degrees to the median plane 4 provides a suitable gradual engagement of the main cutting edge 2 from the corner cutting edge 26 and away therefrom along the main cutting edge 24. The average angle b may be defined by an angle between the median plane 4 and a line extending between an intersection 46 between the corner cutting edge 26 and the main cutting edge 24 and an end 48 of the main cutting edge 24 opposite to the corner cutting edge 26. Mentioned purely as an example, an angle between a tangent of the main cutting edge 24 and the median plane 4 may be approximately 8 degrees close to the corner cutting edge 26 and approximately 12 degrees at the end 48 farthest away from the corner cutting edge 26, the average angle b may in this case be 9.5 degrees.

The cutting insert 2 comprises in total three cutting edges 20, 20', 20" of the same kind as said cutting edge 20 discussed herein extending along the intersection between the first surface 14 and the circumferential surface 18, as well as three cutting edges 20''', 20'''', 20$^V$ of the same kind as said cutting edge 20 also extending along an intersection between the second surface 16 and the circumferential surface 18, see FIGS. 1*a* and 1*c*. In this manner the cutting insert 2 is six times indexable in a shoulder milling tool, whereby each of the six cutting edges 20-20$^V$ can be used, one at a time until the entire cutting insert is worn out.

Figure 4A:
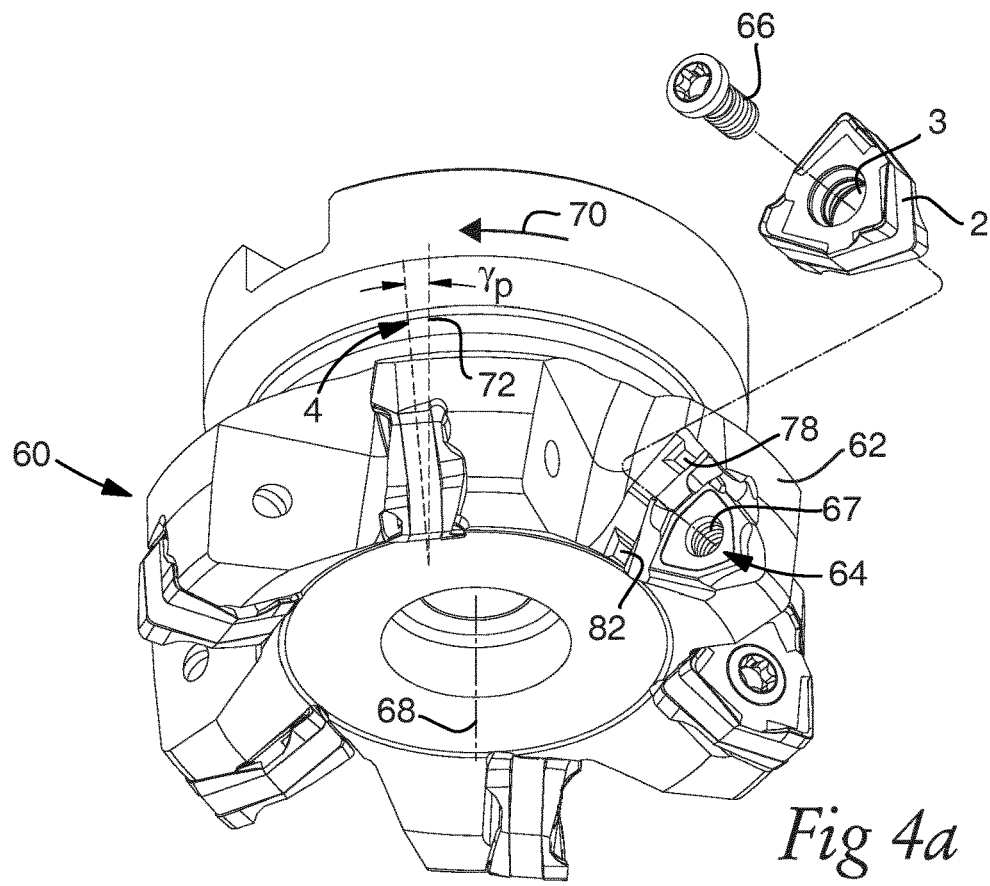
Figure 4B:
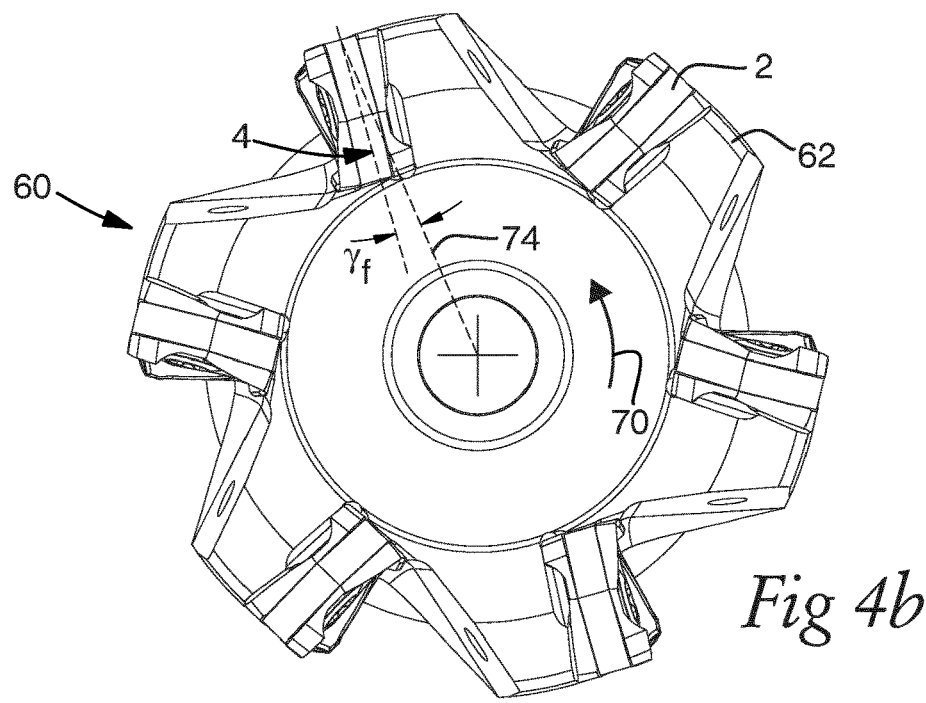

FIGS. 4*a* and 4*b* illustrate a shoulder milling tool 60 according to an embodiment. The shoulder milling tool 60 comprises a tool body 62 being provided with an insert seat 64 for receiving the cutting insert 2 described above. Thus, the shoulder milling tool 60 comprises the cutting insert 2 arranged in the insert seat 64. The cutting insert 2 is secured to the tool body 62 in the insert seat 64 by means of a screw 66 extending through the through hole 3 of the cutting inset 2. The screw 66 engages with internal threads 67 in the insert seat 64. Other means of securing the cutting insert 2 to the shoulder milling tool 60 may be used.

The shoulder milling tool 60 is typically provided with more than one cutting insert 2. In this embodiment the tool body 62 comprises six cutting inserts 2 arranged in six insert seats 64 of the shoulder milling tool 60. The shoulder milling tool 60 is rotatable about a central rotation axis 68 in a direction indicated by the arrow 70, wherein the cutting insert 2 is mounted for cutting into a workpiece with the main cutting edge extending in the axial direction and the surface-wiping secondary edge extending in the radial direction of the shoulder milling tool. The shoulder milling tool 60 can also be used for ramping or plunge milling, i.e. milling in the axial direction of the milling tool 60. Mentioned purely as an example, the shoulder milling tool 60 may have a diameter within a range of 32-250 mm. Obviously, the number of insert seats and cutting inserts 2 may vary depending on for instance the diameter of the shoulder milling tool or the operating condition of the milling tool (e.g. stability conditions, available power and workpiece material).

According to the shown embodiment, the insert seat 64 is configured to provide a negative axial rake angle γp for the median plane 4 of the cutting insert 2 arranged in the insert seat 64. The insert seat 64 is hereby configured to provide a negative axial rake angle γp within a range of 1-11 degrees, or within a range of 4-8 degrees, or of 6 degrees. The negative axial rake angle γp is measured between the median plane 4 of the cutting insert 2 and a line 72 extending in parallel with the rotation axis 68 (the axial direction of the shoulder milling tool 60).

According to the embodiment, the insert seat 64 is also configured to provide a negative radial rake angle γf for the median plane 4 of the cutting insert 2 arranged in the insert seat 64. The insert seat 64 is configured to provide a negative radial rake angle γf within a range of 8-20 degrees, or within a range of 11-17 degrees, or of 14 degrees. The negative radial rake angle γf is measured between the median plane 4 of the cutting insert 2 and a radially extending line 74 from the rotation axis 68 (the radial direction of the shoulder milling tool 60). In combination with the nominal negative clearance angle α of the main cutting edge 24, discussed above with reference to FIG. 3*a*, a functional positive clearance angle of the main cutting edge is formed by the radial rake angle γf. For instance, the exemplified negative clearance angle α of approximately 5 degrees and the negative radial rake angle γf of approximately 14 degrees provide a functional clearance angle of the main cutting edge of 9 degrees.

The surface-wiping secondary cutting edge 28 is inclined in relation to the median plane 4, as discussed above with reference e.g. to FIG. 2a. The negative radial rake angle γf for the median plane 4 of the cutting insert 2 arranged in the insert seat 64 provides for a larger inclination of the surface-wiping secondary cutting edge 28 in relation to the radially extending line 74. The exemplified 3.5 degree inclination in relation to the median plane 4 together with the exemplified the negative radial rake angle γf of 14 degrees provides for a 17.5 degree inclination of the surface-wiping secondary cutting edge 28 in relation to the radially extending line 74. The inclination of 17.5 degrees entails that one force component of the cutting forces acting on the surface-wiping secondary cutting edge 28 push the cutting insert 2 into the insert seat, see also below with reference to FIGS. 5a-5c.

Figure 5A:
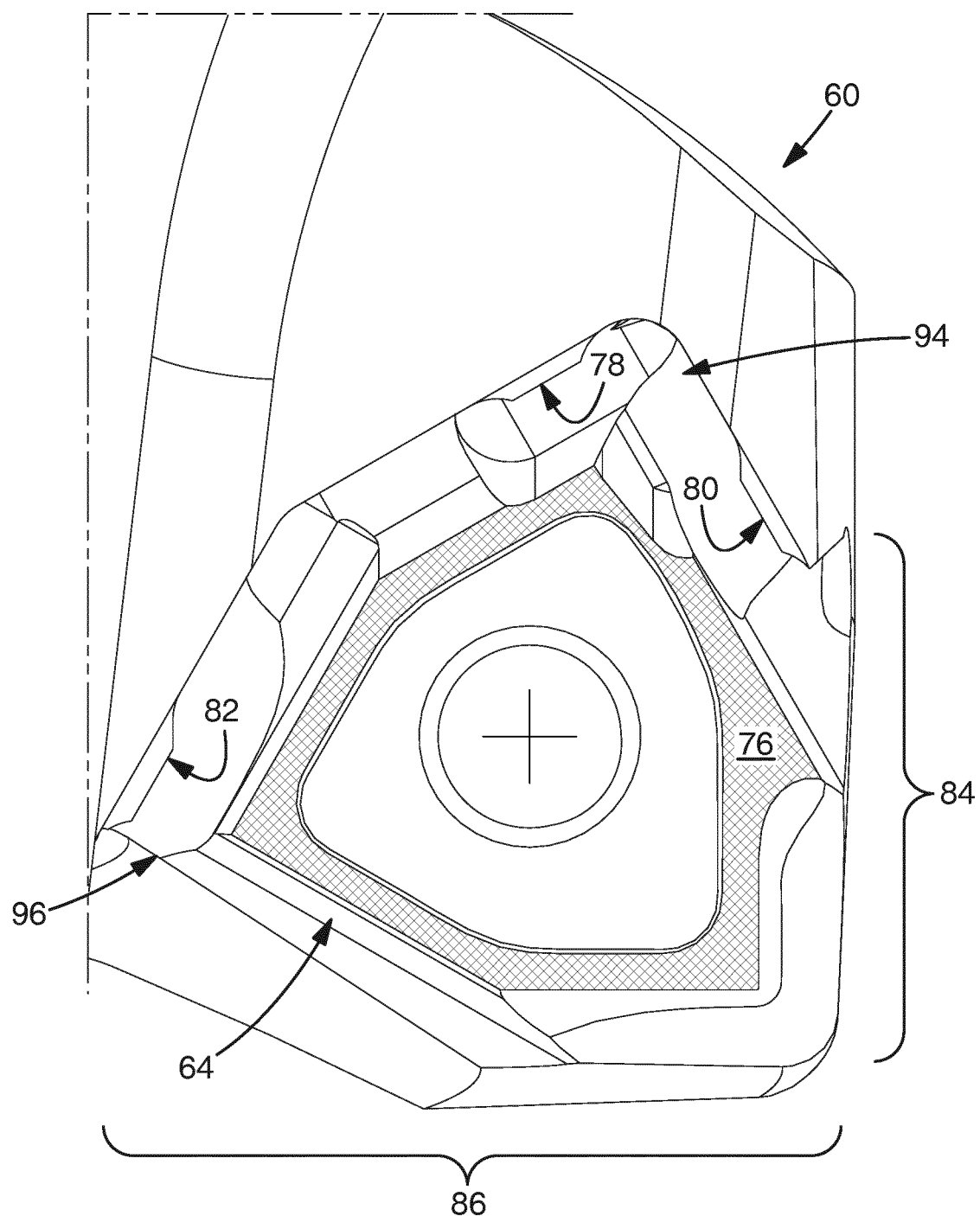
FIG. 5a illustrates an insert seat of the shoulder milling tool of FIGS. 4a and 4b.

FIG. 5a illustrates an insert seat 64 of the shoulder milling tool 60 of FIGS. 4a and 4b. FIG. 5b illustrates a cutting insert 2 secured in the insert seat 64 shown in FIG. 5a. FIG. 5c illustrates a cross-section trough the shoulder milling tool 60 along line Vc-Vc in FIG. 5a. FIG. 5d illustrates a cross-section through the shoulder milling tool 60 along line Vd-Vd in FIG. 5a. The insert seat 64 is provided with a bottom support surface 76, a first side support surface 78, a second side support surface 80, and a third side support surface 82. The insert seat 64 comprises a radial opening 84 for exposing the main cutting edge 24 of the cutting insert 2 and an axial opening 86 for exposing the surface-wiping secondary cutting edge 28 of the cutting insert 2. The first side support surface 78, the second side support surface 80, and the third side support surface 82 are extending at a 90 degree angle in relation to the bottom support surface 76. The side support surfaces 78, 80, 82 can alternatively extend at an acute angle in relation to the bottom support surface 76 to provide support above the median plane of the cutting insert only. The first and second side support surfaces 78, 80 are arranged at an approximately 90 degree angle to each other at a first end 94 of the insert seat 64 opposite to the axial opening 86, and the third side support surface 82 is arranged at a second end 96 of the insert seat 64 close to the axial opening 86. The first side support surface 78 faces towards the radial opening 84, the second side support surface 80 faces away from the radial opening 84, and the third side support surface 82 faces towards the radial opening 84. The cutting insert 2 is arranged with a second flat centre surface 44 of the second surface 16 abutting against the bottom support surface 76, and respective portions of the circumferential surface 18 abutting against the first side support surface 78, the second side support surface 80, and the third side support surface 82, see also FIG. 1a. In this manner the cutting insert 2 is stably supported in the insert seat 64 by the four different support surfaces 76, 78, 80, 82 of the insert seat 64. During use of the shoulder milling tool 60, the first and second side support surfaces 78, 80 form axial support surfaces for the cutting insert 2, the first and third side support surfaces 78, 82 form radial support surfaces for the cutting insert 2, and the bottom support surface 76 forms a tangential support surface for the cutting insert 2. The first and second side support surfaces 78, 82 are also shown in FIG. 4a. The bottom support surface 76 is shown as a hatched surface in FIG. 5a.

The cutting insert 2 is stably supported in the insert seat 64 of the shoulder milling tool 60. Firstly, due to the negative nominal clearance angle α of the main clearance surface 50, which provides a relatively wide cutting insert at the countersunk waist or median plane 4, i.e. a wider cutting insert at the circumferential countersunk waist portion 92 than if the main clearance surface 50 would have a neutral or positive nominal clearance angle, as discussed above with reference to FIG. 3a. Thus, the first side support surface 78 abuts against the circumferential surface 18 at the main cutting edge 24 of one of the cutting edges 20' against the first abutment surface 90 at a comparatively large distance from a centre of the cutting insert 2, and the second and third side support surfaces 80, 82 abut against the second abutment surface 90' at each surface-wiping secondary cutting edges 28 of two of the cutting edges 20', 20", wherein in particular the third side abutment surface 82 may abut the second abutment surface 90' at a comparatively large distance from a centre of the cutting insert 3. The cross sections of FIGS. 5c and 5d show the abutments between the first side support surface 78 and the first abutment surface 90, and the abutment between the third side support surface 82 and one of the second abutment surfaces 90', respectively. The second side support surface 80 abuts against the other second abutment surface 90' in a manner substantially corresponding to the illustration of FIG. 5d. Secondly, due to the provision of the flat centre surface 44 beneath the cutting edge 20 and the lack of a chip breaker, as discussed above with reference to FIGS. 1a-1c and 3-3c, a comparatively large flat abutment surface is formed by the flat centre surface 44, which at least partially abuts against the bottom support surface 76 of the insert seat 64. Thirdly, due to the arrangement with the first, second, and third side support surfaces 78, 80, 82 supporting the circumferential surface 18 of the cutting insert 2, the cutting insert 2 is firmly positioned in the radial position and the axial position in the insert seat 64 of the shoulder milling tool 60. Fourthly, the inclination of the surface-wiping secondary cutting edge 28 causes a component of the cutting forces at the surface-wiping secondary cutting edge 28 to push the cutting insert 2 into the insert seat 64. The arrow 98 in FIG. 5b indicates the force component pushing the into the insert seat.

Of the six cutting edges 20 of the cutting insert 2 only one is arranged for cutting engagement with a workpiece. The cutting edge 20 arranged for such cutting engagement may be referred to as the active cutting edge. Accordingly, the radial opening 84 exposes the active main cutting edge 24 and the axial opening 86 exposes the active surface-wiping secondary cutting edge 28. Naturally, the active corner cutting edge 26 is also exposed for cutting action with the workpiece. The other two cutting edges 20', 20", at the first surface 14 are arranged in inactive positions. As discussed above, portions of the circumferential surface 18 at the other two cutting edges 20', 20" abut against the first, second, and third side support surfaces 78, 80, 82. Specifically, the first abutment surface 90 at the main cutting edge of the inactive cutting edge 20' abuts against the first side support surface 78, see FIG. 5c, and the second abutment surface 90' at the surface-wiping secondary cutting edge of the inactive cutting edge 20' abuts against the second side support surface 80. The second abutment surface 90' at the surface-wiping secondary cutting edge of the inactive cutting edge 20" abuts against the third side support surface 82, see FIG. 5d.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

The invention claimed is:

1. A cutting insert for a shoulder milling tool, the cutting insert comprising:
   a body having a trigonal shape and a median plane extending through the body;
   a first surface, an opposite second surface, and a circumferential surface extending between the first surface and the second surface, the first and second surfaces extending on opposite sides of the median plane;
   three indexable cutting edges extending along an intersection between the first surface and the circumferential surface, wherein each indexable cutting edge, as seen in a view towards the first surface, extends along a corner of the trigonally shaped body, wherein each indexable cutting edge includes a main cutting edge, a corner cutting edge, and a surface-wiping secondary cutting edge, wherein the main cutting edge adjoins the corner cutting edge, and the corner cutting edge adjoins the surface-wiping secondary cutting edge, wherein the surface-wiping secondary cutting edge is inclined in relation to the median plane such that a distance to the median plane decreases in a direction towards the corner cutting edge, wherein the circumferential surface includes a clearance surface extending along the main cutting edge, wherein the clearance surface along the main cutting edge extends at an acute angle to the median plane, such that the clearance surface forms a negative nominal clearance angle, wherein the circumferential surface includes a first abutment surface configured for abutment against an axial and/or radial support surface of the shoulder milling tool, the first abutment surface extending along at least part of the main cutting edge, and wherein the circumferential surface includes a second abutment surface configured for abutment against the axial and/or radial support surface of the shoulder milling tool, the second abutment surface extending along at least a part of the surface-wiping secondary edge, wherein the first surface includes a flat centre surface transforming into an inclined main rake face adjacent to the main cutting edge, wherein an entirety of the main cutting edge and the inclined main rake face extends at a greater distance from the median plane than the flat centre surface.

2. The cutting insert according to claim 1, wherein the circumferential surface includes a circumferential countersunk waist portion situated at the median plane, wherein the first and second abutment surfaces are formed in the circumferential countersunk waist portion.

3. The cutting insert according to claim 1, wherein the surface-wiping secondary cutting edge extends at an average angle within a range of 1-6 degrees to the median plane.

4. The cutting insert according to claim 1, wherein the flat centre surface transforms into an inclined secondary rake face adjacent to the surface-wiping secondary cutting edge, wherein an entirety of the surface-wiping secondary cutting edge and the inclined secondary rake face are arranged at a greater distance from the median plane than the flat centre surface.

5. The cutting insert according to claim 1, wherein the cutting insert is a double-sided cutting insert with three additional indexable cutting edges extending along an intersection between the second surface and the circumferential surface, each of the first and second surfaces having a flat centre surface arranged to abut against a bottom support surface of the shoulder milling tool.

6. The cutting insert according to claim 1, wherein the main cutting edge is inclined in relation to the median plane such that a distance to the median plane decreases in a direction away from the corner cutting edge.

7. The cutting insert according to claim 6, wherein the main cutting edge extends at an average angle within a range of 6-14 degrees to the median plane.

8. The cutting insert according to claim 1, wherein the clearance surface along the main cutting edge extends at an acute angle within a range of 83-87 degrees to the median plane.

9. A shoulder milling tool comprising:
   a tool body provided with an insert seat; and
   a cutting insert according to claim 1 arranged in the insert seat.

10. The shoulder milling tool according to claim 9, wherein the insert seat is provided with a bottom support surface, a first side support surface, a second side support surface, and a third side support surface, wherein the insert seat has a radial opening for exposing the main cutting edge of the cutting insert and an axial opening for exposing the surface-wiping secondary cutting edge of the cutting insert, wherein the first side support surface, the second side support surface, and the third side support surface extend transverse to the bottom support surface, wherein the first and second side support surfaces are arranged to support the first and second abutment surfaces of an inactive indexable cutting edge at a first end of the insert seat opposite to the axial opening, and the third side support surface is arranged to support the second abutment surface of another inactive indexable cutting edge at a second end of the insert seat close to the axial opening, and wherein the cutting insert is arranged with the second surface abutting against the bottom support surface.

11. The shoulder milling tool according to claim 9, wherein the insert seat is configured to provide a negative axial rake angle for the median plane of the cutting insert arranged in the insert seat, and wherein the negative axial rake angle is within a range of 1-11 degrees.

12. The shoulder milling tool according to claim 9, wherein the insert seat is configured to provide a negative radial rake angle for the median plane of the cutting insert arranged in the insert seat, and wherein the negative radial rake angle is within a range of 8-20 degrees.

* * * * *